United States Patent
Tayal et al.

(10) Patent No.: US 10,608,901 B2
(45) Date of Patent: Mar. 31, 2020

(54) SYSTEM AND METHOD FOR APPLYING MACHINE LEARNING ALGORITHMS TO COMPUTE HEALTH SCORES FOR WORKLOAD SCHEDULING

(71) Applicant: Cisco Technology, Inc., San Jose, CA (US)

(72) Inventors: Chirag Tayal, Fremont, CA (US); Esha Desai, San Jose, CA (US); Paddu Krishnan, Fremont, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 120 days.

(21) Appl. No.: 15/647,549

(22) Filed: Jul. 12, 2017

(65) Prior Publication Data

US 2019/0020555 A1     Jan. 17, 2019

(51) Int. Cl.
| | |
|---|---|
| *H04L 12/26* | (2006.01) |
| *G06F 9/50* | (2006.01) |
| *H04L 29/08* | (2006.01) |
| *G06F 9/455* | (2018.01) |
| *G06N 3/02* | (2006.01) |
| *H04L 12/46* | (2006.01) |

(52) U.S. Cl.
CPC .......... *H04L 43/04* (2013.01); *G06F 9/45533* (2013.01); *G06F 9/505* (2013.01); *G06N 3/02* (2013.01); *H04L 12/4641* (2013.01); *H04L 67/101* (2013.01); *H04L 67/1008* (2013.01); *H04L 67/1012* (2013.01)

(58) Field of Classification Search
CPC ... H04L 43/04; H04L 12/4641; H04L 67/101; G06F 9/45533; G06N 3/02
USPC .......................................................... 709/224
See application file for complete search history.

(56) References Cited

U.S. PATENT DOCUMENTS

| | | | |
|---|---|---|---|
| 5,185,848 | A | 2/1993 | Aritsuka et al. |
| 5,917,537 | A | 6/1999 | Lightfoot et al. |
| 5,970,064 | A | 10/1999 | Clark et al. |
| 6,023,606 | A | 2/2000 | Monte et al. |

(Continued)

FOREIGN PATENT DOCUMENTS

CN     102004671     3/2013

OTHER PUBLICATIONS

"VXLAN Network with MP-BGP EVPN Control Plane Design Guide," ©Cisco Systems, Inc., Mar. 21, 2016, 44 pages.

(Continued)

*Primary Examiner* — Kristie D Shingles
(74) *Attorney, Agent, or Firm* — Polsinelli PC (57) ABSTRACT

Disclosed is a method that includes collecting first temporal statistics for a port element in a computing environment, collecting second temporal statistics for a switch element in the computing environment, collecting third temporal statistics for the computing environment generally, computing a spatial correlation between network features and network elements comprising the port element and the switch element and computing, via a machine learning technique, a port dynamic weight for the port element and a switch dynamic weight for the switch element. The method can also include scheduling workload to consume compute resources within the compute environment based at least in part on the port dynamic weight for the port element and the switch dynamic weight for the switch element.

12 Claims, 5 Drawing Sheets

(56) References Cited

U.S. PATENT DOCUMENTS

| | | |
|---|---|---|
| 6,115,393 A | 9/2000 | Engel et al. |
| 6,298,351 B1 | 10/2001 | Castelli et al. |
| 6,456,624 B1 | 9/2002 | Eccles et al. |
| 6,597,684 B1 | 7/2003 | Gulati et al. |
| 6,697,325 B1 | 2/2004 | Cain |
| 6,721,899 B1 | 4/2004 | Narvaez-Guarnieri et al. |
| 6,816,464 B1 | 11/2004 | Scott et al. |
| 6,894,714 B2 | 5/2005 | Gutta et al. |
| 6,954,617 B2 | 10/2005 | daCosta |
| 7,185,077 B1 | 2/2007 | O'Toole et al. |
| 7,453,864 B2 | 11/2008 | Kennedy et al. |
| 7,496,650 B1 | 2/2009 | Previdi et al. |
| 7,826,372 B1 | 11/2010 | Mabe et al. |
| 7,826,400 B2 | 11/2010 | Sackauchi |
| 7,848,340 B2 | 12/2010 | Sackauchi et al. |
| 7,995,464 B1 | 8/2011 | Croak et al. |
| 8,059,557 B1 | 11/2011 | Sigg et al. |
| 8,063,929 B2 | 11/2011 | Kurtz et al. |
| 8,154,583 B2 | 4/2012 | Kurtz et al. |
| 8,274,893 B2 | 9/2012 | Bansal et al. |
| 8,385,355 B1 | 2/2013 | Figueira et al. |
| 8,489,765 B2 | 7/2013 | Vasseur et al. |
| 8,620,840 B2 | 12/2013 | Newnham et al. |
| 8,630,291 B2 | 1/2014 | Shaffer et al. |
| 8,634,314 B2 | 1/2014 | Banka et al. |
| 8,638,778 B2 | 1/2014 | Lee et al. |
| 8,707,194 B1 | 4/2014 | Jenkins et al. |
| 8,767,716 B2 | 7/2014 | Trabelsi et al. |
| 8,774,164 B2 | 7/2014 | Klein et al. |
| 8,842,161 B2 | 9/2014 | Feng et al. |
| 8,856,584 B2 | 10/2014 | Matsubara |
| 8,862,522 B1 | 10/2014 | Jaiswal et al. |
| 8,880,477 B2 | 11/2014 | Barker et al. |
| 8,942,085 B1 | 1/2015 | Pani et al. |
| 8,948,054 B2 | 2/2015 | Kreeger et al. |
| 8,982,707 B2 | 3/2015 | Moreno et al. |
| 9,137,119 B2 | 9/2015 | Yang et al. |
| 9,197,553 B2 | 11/2015 | Jain et al. |
| 9,324,022 B2 | 4/2016 | Williams, Jr. et al. |
| 9,338,065 B2 | 5/2016 | Vasseur et al. |
| 9,338,084 B2 | 5/2016 | Badoni |
| 9,374,294 B1 | 6/2016 | Pani |
| 9,419,811 B2 | 8/2016 | Dong et al. |
| 9,544,224 B2 | 1/2017 | Chu et al. |
| 9,553,799 B2 | 1/2017 | Tarricone et al. |
| 9,558,451 B2 | 1/2017 | Nilsson et al. |
| 9,559,914 B1 | 1/2017 | Groenewald |
| 9,596,099 B2 | 3/2017 | Yang et al. |
| 9,614,756 B2 | 4/2017 | Joshi |
| 9,654,385 B2 | 5/2017 | Chu et al. |
| 2002/0061001 A1 | 5/2002 | Garcia-Luna-Aceves et al. |
| 2002/0101505 A1 | 8/2002 | Gutta et al. |
| 2002/0105904 A1 | 8/2002 | Hauser et al. |
| 2002/0116154 A1 | 8/2002 | Nowak et al. |
| 2002/0159386 A1 | 10/2002 | Grosdidier et al. |
| 2003/0005149 A1 | 1/2003 | Haas et al. |
| 2003/0061340 A1 | 3/2003 | Sun et al. |
| 2003/0067912 A1 | 4/2003 | Mead et al. |
| 2003/0091052 A1 | 5/2003 | Pate et al. |
| 2003/0117992 A1 | 6/2003 | Kim et al. |
| 2003/0133417 A1 | 7/2003 | Badt, Jr. |
| 2003/0187800 A1 | 10/2003 | Moore et al. |
| 2003/0225549 A1 | 12/2003 | Shay et al. |
| 2004/0153563 A1 | 8/2004 | Shay et al. |
| 2004/0218525 A1 | 11/2004 | Elie-Dit-Cosaque et al. |
| 2005/0111487 A1 | 5/2005 | Matta et al. |
| 2005/0114532 A1 | 5/2005 | Chess et al. |
| 2005/0143979 A1 | 6/2005 | Lee et al. |
| 2005/0286711 A1 | 12/2005 | Lee et al. |
| 2006/0072471 A1 | 4/2006 | Shiozawa |
| 2006/0083193 A1 | 4/2006 | Womack et al. |
| 2006/0116146 A1 | 6/2006 | Herrod et al. |
| 2006/0133404 A1 | 6/2006 | Zuniga et al. |
| 2006/0274647 A1 | 12/2006 | Wang et al. |
| 2007/0047707 A1 | 3/2007 | Mayer et al. |
| 2007/0071030 A1 | 3/2007 | Lee |
| 2007/0083650 A1 | 4/2007 | Collomb et al. |
| 2007/0120966 A1 | 5/2007 | Murai |
| 2007/0149249 A1 | 6/2007 | Chen et al. |
| 2007/0192065 A1 | 8/2007 | Riggs et al. |
| 2007/0208590 A1 | 9/2007 | Dorricott et al. |
| 2008/0049622 A1 | 2/2008 | Previdi et al. |
| 2008/0089246 A1 | 4/2008 | Ghanwani et al. |
| 2008/0140817 A1 | 6/2008 | Agarwal et al. |
| 2008/0159151 A1 | 7/2008 | Datz et al. |
| 2008/0181259 A1 | 7/2008 | Andreev et al. |
| 2008/0192651 A1 | 8/2008 | Gibbings |
| 2008/0293353 A1 | 11/2008 | Mody et al. |
| 2009/0003232 A1 | 1/2009 | Vaswani et al. |
| 2009/0010264 A1 | 1/2009 | Zhang |
| 2009/0073988 A1 | 3/2009 | Ghodrat et al. |
| 2009/0129316 A1 | 5/2009 | Ramanathan et al. |
| 2009/0147714 A1 | 6/2009 | Jain et al. |
| 2009/0147737 A1 | 6/2009 | Tacconi et al. |
| 2009/0168653 A1 | 7/2009 | St. Pierre et al. |
| 2009/0271467 A1 | 10/2009 | Boers et al. |
| 2009/0303908 A1 | 12/2009 | Deb et al. |
| 2010/0046504 A1 | 2/2010 | Hill |
| 2010/0165863 A1 | 7/2010 | Nakata |
| 2011/0082596 A1 | 4/2011 | Meagher et al. |
| 2011/0090960 A1* | 4/2011 | Leontaris ............. H04N 19/103 375/240.12 |
| 2011/0116389 A1 | 5/2011 | Tao et al. |
| 2011/0149759 A1 | 6/2011 | Jollota |
| 2011/0228696 A1 | 9/2011 | Agarwal et al. |
| 2011/0255570 A1 | 10/2011 | Fujiwara |
| 2011/0267962 A1 | 11/2011 | J S A et al. |
| 2011/0274283 A1 | 11/2011 | Athanas |
| 2012/0009890 A1 | 1/2012 | Curcio et al. |
| 2012/0075999 A1 | 3/2012 | Ko et al. |
| 2012/0163177 A1 | 6/2012 | Vaswani et al. |
| 2012/0192075 A1 | 7/2012 | Ebtekar et al. |
| 2012/0213062 A1 | 8/2012 | Liang et al. |
| 2012/0213124 A1 | 8/2012 | Vasseur et al. |
| 2012/0307629 A1 | 12/2012 | Vasseur et al. |
| 2012/0321058 A1 | 12/2012 | Eng et al. |
| 2013/0003542 A1 | 1/2013 | Catovic et al. |
| 2013/0010610 A1 | 1/2013 | Karthikeyan et al. |
| 2013/0028073 A1 | 1/2013 | Tatipamula et al. |
| 2013/0070755 A1 | 3/2013 | Trabelsi et al. |
| 2013/0094647 A1 | 4/2013 | Mauro et al. |
| 2013/0128720 A1 | 5/2013 | Kim et al. |
| 2013/0177305 A1 | 7/2013 | Prakash et al. |
| 2013/0250754 A1 | 9/2013 | Vasseur et al. |
| 2013/0275589 A1 | 10/2013 | Karthikeyan et al. |
| 2013/0311673 A1 | 11/2013 | Karthikeyan et al. |
| 2014/0049595 A1 | 2/2014 | Feng et al. |
| 2014/0126423 A1 | 5/2014 | Vasseur et al. |
| 2014/0133327 A1 | 5/2014 | Miyauchi |
| 2014/0204759 A1 | 7/2014 | Guo et al. |
| 2014/0207945 A1 | 7/2014 | Galloway et al. |
| 2014/0215077 A1 | 7/2014 | Soudan et al. |
| 2014/0219103 A1 | 8/2014 | Vasseur et al. |
| 2014/0293955 A1 | 10/2014 | Keerthi |
| 2014/0337840 A1 | 11/2014 | Hyde et al. |
| 2015/0023174 A1 | 1/2015 | Dasgupta et al. |
| 2015/0052095 A1 | 2/2015 | Yang et al. |
| 2015/0081247 A1* | 3/2015 | Valentino ................ G01P 13/00 702/150 |
| 2015/0142702 A1 | 5/2015 | Nilsson et al. |
| 2015/0178620 A1* | 6/2015 | Ascari .................... G06N 3/049 706/21 |
| 2015/0215365 A1 | 7/2015 | Shaffer et al. |
| 2015/0324689 A1 | 11/2015 | Wierzynski et al. |
| 2015/0338525 A1* | 11/2015 | Valentino ............. G01J 1/0219 250/395 |
| 2015/0358248 A1 | 12/2015 | Saha et al. |
| 2016/0037304 A1 | 2/2016 | Dunkin et al. |
| 2016/0105345 A1 | 4/2016 | Kim et al. |
| 2016/0203404 A1 | 7/2016 | Cherkasova et al. |
| 2016/0315802 A1 | 10/2016 | Wei et al. |
| 2016/0335111 A1 | 11/2016 | Bruun et al. |
| 2017/0078198 A1 | 3/2017 | Nellikar et al. |
| 2017/0150399 A1 | 5/2017 | Kedalagudde et al. |

(56) References Cited

U.S. PATENT DOCUMENTS

| | | |
|---|---|---|
| 2017/0228251 A1 | 8/2017 | Yang et al. |
| 2017/0289033 A1 | 10/2017 | Singh et al. |
| 2017/0347308 A1 | 11/2017 | Chou et al. |
| 2017/0353361 A1 | 12/2017 | Chopra et al. |
| 2018/0013656 A1 | 1/2018 | Chen |

OTHER PUBLICATIONS

International Search Report and Written Opinion from the International Searching Authority, dated Oct. 31, 2018, 13 pages, for the corresponding International Application No. PCT/US2018/041184.

Akkaya, Kemal, et al., "A survey on routing protocols for wireless sensor networks" Abtract, 1 page, Ad Hoc Networks, May 2005.

Alsheikh, Mohammad Abu, et al., "Machine Learning in Wireless Sensor Networks: Algorithms, Strategies, and Applications," Mar. 19, 2015, 23 pages.

Author Unknown, "White Paper on Service Enabler Virtualization," Draft dated Nov. 9, 2015, 26 pages, Open Mobile Alliance (OMA), San Diego, CA, USA.

Baccour, Nouha, et al., "Radio Link Quality Estimation in Wireless Sensor Networks: A Survey," 2011, 35 pages.

Fan, Na, "Learning Nonlinear Distance Functions Using Neural Network for Regression with Application to Robust Human Age Estimation," Abstract, 1 page, IEEE International Conference on Computer Vision (ICCV), Nov. 2011, Institute of Electrical and Electronics Engineers, Barcelona, Spain.

Flushing, Eduardo Feo, et al., "A mobility-assisted protocol for supervised learning of link quality estimates in wireless networks," Feb. 2012, 8 pages.

Fortunato, Santo, "Community Detection in Graphs", arXiv:0906.0612v2 [physics.soc-ph]; Physics Reports 486, 75-174, Jan. 25, 2010, 103 pages.

Godsill, Simon, et al., "Detection and suppression of keyboard transient noise in audio streams with auxiliary keybed microphone," Abstract, 1 page, 2015 IEEE International Conference on Acoustics, Speech and Signal Processing (ICASSP), Apr. 19-24, 2015, Brisbane, QLD, Australia (Abstract available at http://ieeexolore.ieee.org/document/7177995/, downloaded on Feb. 28, 2018.

Hershey, Shawn, et al., "CNN Architectures for Large-Scale Audio Classification," Jan. 10, 2017, 5 pages, Google, Inc., New York, NY, and Mountain View, CA, USA.

Hradis, Michael, et al., "Voice activity detection from gaze in video mediated communication," ACM, Mar. 28-30, 2012 http://medusa.fit.vutbr.cz/TA2/TA2., 4 pages Hui, J., et al., "An IPv6 Routing Header for Source Routes with the Routing Protocol for Low-Power and Lossy Networks (RPL)", Request for Comments 6554, Mar. 2012, 12 pages, Internet Engineering Task Force Trust.

Kuklinski, Slawomir, et al., "Design Principles of Generalized Network Orchestrators," 2016 IEEE International Conference on Communications Workshops (ICC), May 23, 2016, pp. 430-435.

Liu, Tao, et al., "Data-driven Link Quality Prediction Using Link Features," ACM Transactions on Sensor Networks, Feb. 2014, 35 pages.

McKenna, Shannon, et al., "Acoustic Event Detection Using Machine Learning: Identifying Train Events," Sep. 2017, pp. 1-5, http://cs229.stanford.edu/proj2012/McKennaMcLaren-AcousticEventDetectionUsingMachineLearningIdentifyingTrainEvents.pdf, downloaded on Feb. 28, 2018.

Newman, M. E. J., "Analysis of weighted networks," Phys. Rev. E 70, 056131, Jul. 20, 2004, 9 pages, http://arxiv.org/pdf/condmat/0407503.pdf.

Newman, W. E. J., "Modularity and Community Structure in Networks", Proceedings of the National Academy of Sciences of the United States of America, Jun. 2006, vol. 103, No. 23, pp. 8577-8582, PNAS, Washington, DC.

Piczak, Karol J., "Environmental Sound Classification With Convolutional Neutral Networks," 2015 IEEE International Workshop on Machine Learning for Signal Processing, Sep. 17-20, 2015, Boston, USA.

Raghavendra, Kulkarni V., et al., "Computational Intelligence in Wireless Sensor Networks: A Survey," Abstract, 1 page, IEEE Communications Surveys & Tutorials, May 27, 2010.

Salamon, Justin, et al., "Deep Convolutional Neutral Networks and Data Augmentation for Environmental Sound Classification," IEEE Signal Processing Letters, Accepted Nov. 2016, 5 pages.

Siddiky, Feroz Ahmed, et al., "An Efficient Approach to Rotation Invariant Face Detection Using PCA, Generalized Regression Neural Network and Mahalanobis Distance by Reducing Search Space," Abstract, 1 page, 10th International Conference on Computer and Information Technology, Dec. 2007, Dhaka, Bangladesh.

Singh, Shio Kumar, et al., "Routing Protocols in Wireless Sensor Networks—A Survey," International Journal of Computer Science & Engineering Survey (IJCSES) vol. 1, No. 2, Nov. 2010, pp. 63-83.

Tang, Pengcheng, et al., "Efficient Auto-scaling Approach in the Telco Cloud using Self-learning Algorithm," 2015 IEEE Global Communications Conference (Globecom), Dec. 6, 2015, pp. 1-6.

Tang, Yongning, et al., "Automatic belief network modeling via policy interference for SDN fault localization," Journal of Internet Services and Applications, Jan. 20, 2016, pp. 1-13, Biomed Central Ltd., London, UK.

Ting, Jo-Anne, et al., "Variational Bayesian Least Squares: An Application to Brain-Machine Interface Data," Neural Networks, vol. 21, Issue 8, Oct. 2008, pp. 1112-1131, Elsevier.

Tsang, Yolanda, et al., "Network Radar: Tomography from Round Trip Time Measurements," ICM'04, Oct. 25-27, 2004, Sicily, Italy.

Vasseur, JP., et al., "Routing Metrics Used for Path Calculation in Low-Power and Lossy Networks," Request for Comments 6551, Mar. 2012, 30 pages, Internet Engineering Task Force Trust.

Winter, T., et al., "RPL: IPv6 Routing Protocol for Low-Power and Lossy Networks," Request for Comments 6550, Mar. 2012, 157 pages, Internet Engineering Task Force Trust.

Zhang, Xiaoju, et al., "Dilated convolution neutral network with LeakyReLU for environmental sound classification," Abstract, 1 page, 2017 $22^{nd}$ International Conference on Digital Signal Processing (DSP), Aug. 23-25, 2017, London, U.K.

Zinkevich, Martin, et al. "Parallelized Stochastic Gradient Descent," 2010, 37 pages.

\* cited by examiner

SYSTEM AND METHOD FOR APPLYING MACHINE LEARNING ALGORITHMS TO COMPUTE HEALTH SCORES FOR WORKLOAD SCHEDULING

TECHNICAL FIELD

The present disclosure provides an approach for scheduling workload in a compute environment by taking into account spatial characteristics and machine learning techniques to compute a health score of network elements such as a switch or a port. The concept enables more accurately scheduling of workload in a more stable manner based on the health score.

BACKGROUND

The popularity of server virtualization in computing environments, which can include storage virtualization, has resulted in a rapid rise in cloud-based data centers. In a data center, workloads (virtual machines, containers or bare metal) are deployed by the compute and storage orchestrators based on various heuristics. Typically, these heuristics include server resources such as vCPU, memory usage, etc. Such heuristics are also often based only on the instantaneous health of the compute servers. Other heuristics include deploying a workload based on application affinity, selection of compute nodes closer to a storage bank, etc. The problem with the compute or storage orchestrators (such as OpenStack, VMware, and the like), with respect to their scheduling decisions, is that they are typically "blind" to the network state.

Deploying a workload below a top of the rack (ToR) switch that is not going to be able to satisfy its network requirement is not useful. Many of the algorithms today take only the instantaneous statistics of the network into account for computing the health score or for scheduling the workloads. The schedulers do not take into account various network or fabric problems that can affect performance of the workload as it gets scheduled and deployed into the compute environment. Current network health algorithms use static weights and other static coefficients in their health computation, which can produce less than accurate health evaluations. This inaccuracy weakens the ability of the algorithms to schedule workload as efficiently as possible and results in scheduling decisions that are less than optimal.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DESCRIPTION OF EXAMPLE EMBODIMENTS

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Overview

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

[1] The disclosure generally deals with improvements for obtaining the health of a network fabric in an improved manner and using a health score for scheduling or migrating workload. The disclosed concept seeks to determine the health score or a health evaluation of a network element such as a port or a switch for use in scheduling workload. By providing a more robust evaluation of a health of a switch or a port, the present disclosure provides improved data for making more stable scheduling decisions for workload behind a particular switch. Improved scheduling decisions can reduce the number of later migrations due to an issue within the network fabric.

[2] An example method includes collecting first temporal statistics for a port element in a computing environment, collecting second temporal statistics for a switch element in the computing environment, collecting third temporal statistics for the computing environment generally, computing a spatial correlation between network features and network elements including the port element and the switch element and computing, via a machine learning technique, a port dynamic weight for the port element and a switch dynamic weight for the switch element. Other elements such as routers or any other network element or attribute can also have a weight assigned.

[3] The method can also include scheduling workload to consume compute resources within the compute environment based at least in part on the port dynamic weight for the port element and the switch dynamic weight for the switch element. Collecting the first, second and/or third temporal statistics can include collecting historical and current metrics to generate the respective first, second or third temporal statistics. The approach to calculating the health score disclosed herein utilizes a neural network model for determining dynamic weights for network elements as well as administrative states and can be coupled with an analysis of spatial dependencies among network attributes to provide the health score for a respective network element. Scheduling of workload can then be made based on the health score.

[4] An aspect of this disclosure can also include computing the health score for one of the port element or the switch element. Other elements as well, such as routers, for example, can be included in the health score. The health score can apply to any network element or attribute, such as bandwidth available between two components or a health of an overall fabric environment. The health score can also be used to make migration decisions.

DETAILED DESCRIPTION

The present disclosure addresses the issues raised above. The disclosure provides a system, method and computer-readable storage device embodiments. First a general example system shall be disclosed in FIG. 1 which can provide some basic hardware components making up a server, node or other computer system.

Figure 1:
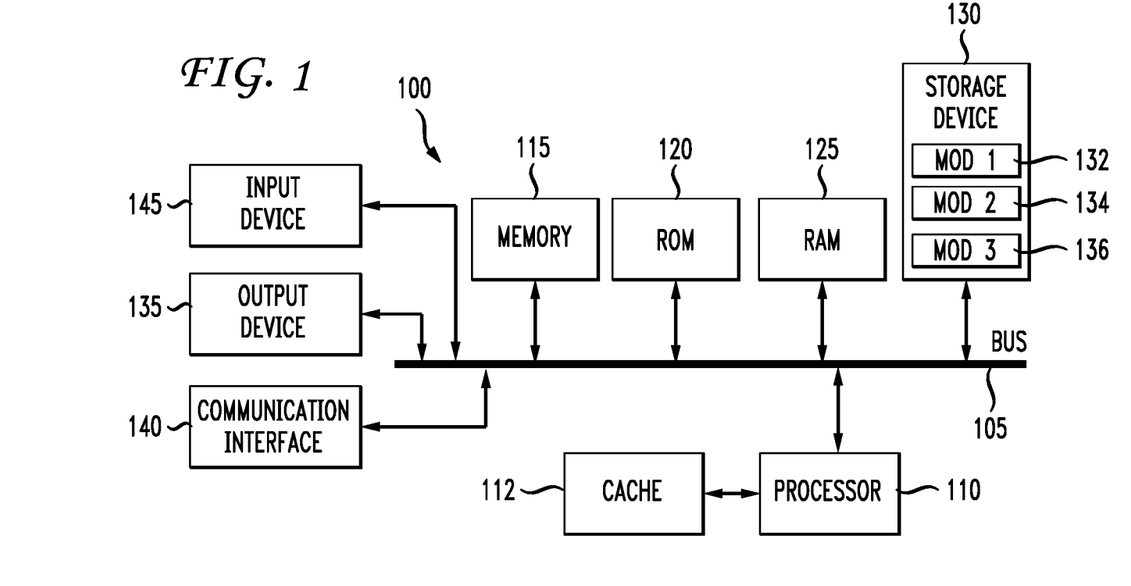
FIG. 1 illustrates an example system configuration.

FIG. 1 illustrates a computing system architecture 100 wherein the components of the system are in electrical communication with each other using a connector 105. Exemplary system 100 includes a processing unit (CPU or processor) 110 and a system connector 105 that couples various system components including the system memory 115, such as read only memory (ROM) 120 and random access memory (RAM) 125, to the processor 110. The system 100 can include a cache of high-speed memory connected directly with, in close proximity to, or integrated as part of the processor 110. The system 100 can copy data from the memory 115 and/or the storage device 130 to the cache 112 for quick access by the processor 110. In this way, the cache can provide a performance boost that avoids processor 110 delays while waiting for data. These and other modules/services can control or be configured to control the processor 110 to perform various actions. Other system memory 115 may be available for use as well. The memory 115 can include multiple different types of memory with different performance characteristics. The processor 110 can include any general purpose processor and a hardware module or software module/service, such as service 1 132, service 2 134, and service 3 136 stored in storage device 130, configured to control the processor 110 as well as a special-purpose processor where software instructions are incorporated into the actual processor design. The processor 110 may essentially be a completely self-contained computing system, containing multiple cores or processors, a bus (connector), memory controller, cache, etc. A multi-core processor may be symmetric or asymmetric.

To enable user interaction with the computing device 100, an input device 145 can represent any number of input mechanisms, such as a microphone for speech, a touch-sensitive screen for gesture or graphical input, keyboard, mouse, motion input, speech and so forth. An output device 135 can also be one or more of a number of output mechanisms known to those of skill in the art. In some instances, multimodal systems can enable a user to provide multiple types of input to communicate with the computing device 100. The communications interface 140 can generally govern and manage the user input and system output. There is no restriction on operating on any particular hardware arrangement and therefore the basic features here may easily be substituted for improved hardware or firmware arrangements as they are developed.

Storage device 130 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 125, read only memory (ROM) 120, and hybrids thereof.

The storage device 130 can include software services 132, 134, 136 for controlling the processor 110. Other hardware or software modules/services are contemplated. The storage device 130 can be connected to the system connector 105. In one aspect, a hardware module that performs a particular function can include the software component stored in a computer-readable medium in connection with the necessary hardware components, such as the processor 110, connector 105, display 135, and so forth, to carry out the function.

Figure 2:
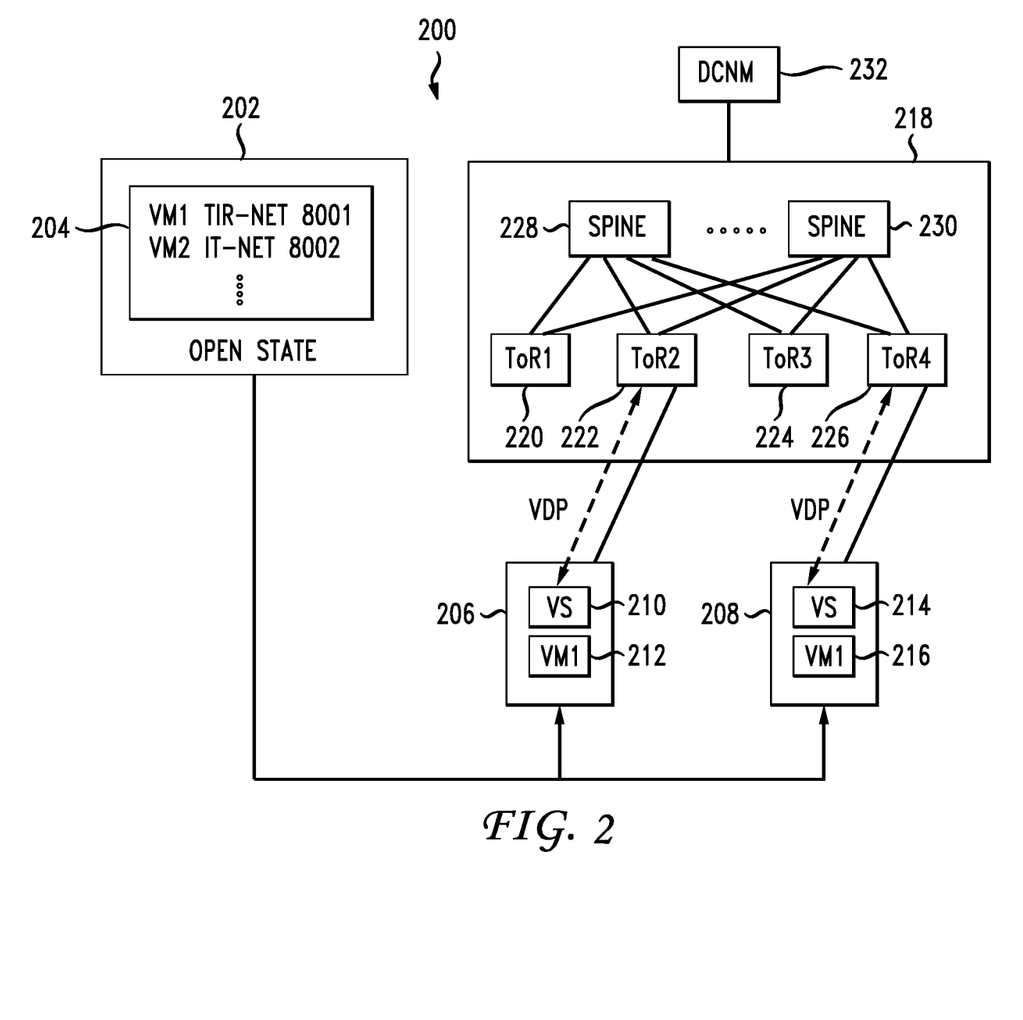
FIG. 2 illustrates a network fabric for identifying some of the issues to be considered when scheduling workload.

Having introduced the basic computing components which can be applicable to embodiments associated with this disclosure, the disclosure now turn to the specific details of the improvements disclosed herein. The popularity of server virtualization, which can include storage, has resulted in the increase in cloud-based data centers. Workloads are deployed by the compute and storage orchestrators based on various heuristics which are typically "blind" to the network state. Deploying a workload below a top of rack switch (ToR) that is not going to be able to satisfy its network requirement is not optimal and can result in the requirement of migrating the workload to another location. FIG. 2 illustrates a system 200 with various components that will be used to show various cases where a workload does not get the network requirements met. FIG. 2 shows a standard spine and leaf topology 200 with an Openstack platform 202 that manages and makes available virtual machines 204 to users (VM1, VM2).

OpenStack free and open-source software platform cloud computing infrastructure-as-a-service data center or other environment command-line RESTful Application Programming Interface Shown in FIG. 2 is a Virtual Switch Interface Discovery Protocol (VDP) and its underlying Edge Control Protocol (ECP) (not shown) which provide a virtual switch interface between the virtual switch and virtual machine 206 (or host) and a ToR2 222 within the compute environment 218 and that sends the required attributes for physical and virtual connections to the external switch ToR2 222. The VDP also lets the external switch 222 validate connections and provides the appropriate resources. Also shown in a VDP between the virtual switch and virtual machine 208 and ToR4 226. Of course these connections are merely shown by way of example.

The groups of ToRs (1, 2, 3, 4) each are shown with a data communication link between the respective ToR and spines 228 and 230. The fabric 218 is controlled by a device 232 such as the Cisco Data Center Network Manager (DCNM). With reference to the fabric environment 200 shown in FIG. 2, the disclosure can outline several issues with respect to scheduling workload that can be problematic. Typically, scheduling a workload based only on the server characteristics can affect the network performance of the workload. A mechanism that takes the network characteristics apart from the server characteristics into account is needed when placing a workload.

When the network health takes only the instantaneous statistics, this can create more churn in the placement/replacement of workloads. Consider an example where a workload is placed in a compute node behind ToR2 222 in FIG. 2. If ToR2's network health score (HS) is bad (indicating that there may be a low bandwidth or no bandwidth in the data links between the ToR2 222 and spine 228 and spine 230), the workload may have to be migrated to another server (say server 208) that is connected to a ToR (say ToR4 226) that has a good HS. The process of migration can cause the HS of TOR1 220 or ToR3 224 to go down, which can then require additional migration of other workloads associated with those ToRs. The continuous migration of workloads will cause performance issues for many applications.

Using only the temporal, instantaneous statistics for computing the health score does not provide long term stability for workload placement.

Other issues that can arise when scheduling workload can include the connectivity between a compute node 206 and a ToR2 222 for an extended period of time. Any respective ToR (say ToR2) may be temporarily unavailable. Further, ToR2's software and/or hardware resources may be running low, which can slow down performance. In addition, the fabric 218 bandwidth may be heavily used thus the throughput between respective ToRs and spines can be a bottleneck. These and other network or fabric based issues can cause headaches for server administrators and confusion for network administrators. The various issues that can arise are not necessarily considered in the evaluation of where and when to place workload.

Many of the current algorithms take only the instantaneous statistics of the network into account for computing the health score or for scheduling workloads. The health score and in turn the scheduling of the workload can, according to this disclosure consider one or more of the following factors: (1) Instantaneous network statistics; (2) Past statistics and variances thereof; and (3) Forecasting using spatial correlation of the network parameters and its affect on the overall health.

Some of the improvements over the existing methods are outlined next. Current network health algorithms typically use static weights and other static coefficients in their health computation, which can produce less than accurate health results. The inaccuracy defeats the purpose of including network health in scheduling decisions. The proposed approach will concentrate more on achieving goal (3) identified above and includes an algorithm using dynamic weights calculated by a machine learning approach that will consider one or more of the above factors, resulting in more accurate health score and stability in scheduling decisions such that less migration of workload is needed. One benefit of the disclosed approach is the avoidance of unnecessary workload migrations. In additional to identifying parameters associated with network elements or resources, the approach disclosed herein also assigns a dynamic weight to one or more elements or resources to provide a more accurate reflection of the health of the element or resource which can then be used in making smarter scheduling decisions.

One novelty of the disclosed approach is that it uses machine learning to correlate multiple attributes and forecasts the behavior of every network feature or element to compute the health score. The algorithm can perform the evaluation separately or in addition to using instantaneous statistics that are obtained periodically.

What is needed is to include the health of the network that includes health of the port, networking device (switch/router) and health of the entire fabric 218 combined. Generally speaking, the concept involves how to improve the scheduling of workload on VM1 or VM2 (or any other virtual or hardware resource) utilizing a health score for a switch (ToR1, ToR2, ToR3 and/or ToR4), a port or any other compute element, administrative state or resource. The approach to calculating the health score disclosed herein utilizes a neural network model for determining dynamic weights for network elements as well as administrative states and can be coupled with an analysis of spatial dependencies among network attributes to provide the health score for a respective network element.

To consider an example, launching more applications with certain properties can increase the traffic rate, the number of MAC/VLAN usage, etc. The temperature of a switch can indirectly reflect the bandwidth of a port or CPU utilization. When these parameters are taken individually, the situation may appear normal. But, when all these data are collected and machine learning, techniques applied to them, the analysis can correlate the various data to probabilistically predict the statistics for certain parameters over a period of time. This predicted metric, when taken into consideration for computing the health score, can be more accurate and provide stability when scheduling or placing workload into the compute environment. The health score can be computed dynamically in one sense, such as when a request for compute resources is received by a scheduler to process workload.

Proposed herein is an analytics algorithm based on unsupervised machine learning techniques (e.g. reinforcement learning and neural networks) to calculate the health of the fabric using collected temporal and spatial data of various fabric elements. Generally, the concept includes obtaining information about a number of different parameters associated with a compute environment which are useful for making scheduling decisions. The concept includes computing or generating a health score for one or more elements or resources using a machine learning technique that enables an algorithm to assign weights dynamically (or statically in one aspect) to one or more parameters to yield weighted components, and then using the weighted components to make scheduling decisions for workload.

Steps for health computation can include one or more of the following steps: A first step can include collecting temporal statistics for one or more fabric element (ports, switches, routers and/or the fabric altogether). Network Telemetry, NxAPI or other network data collection techniques can be used by way of example to collect historical and current network metrics. There are other available solutions as well to collect temporal statistics of each fabric element using telemetry that can be utilized to fulfill the first step of the algorithm.

A second step can include computing a spatial correlation among network features (e.g. number of VLANs, MAC address table usage, Port Errors, etc.) and network elements (e.g. switches/routers). Any network element can be included within the spatial correlation such as relative locations of physical and/or virtual components. The computation will show the dependency of one network feature on another and dependency of one network element on another. In one example, assume that there is workload assigned to server number 10 which is in a rack behind ToR2. Assume that there is other workload on the server or servers as well that are connected to ToR2. Consider that a number of applications running behind ToR2 require a large amount of bandwidth. Assume, at the same time, that there are other bandwidth usage parameters for other switches such as ToR1 and ToR3. The respective network traffic of a respective switch will have an impact on other switches. In one aspect, the spatial correlation will take into account the impact of, for example, bandwidth usage amongst the various switches and how they impact each other. Other network elements can also effect each other in other ways as well, and a spatial correlation calculation can relate any network element to other elements.

A third step can include applying machine learning techniques, e.g. neural networks, to compute dynamic weights for each feature.

In one example, a health score computation equation can be the following:

$$H_f^t = \left(\sum_{i=1}^{n}(W_i * P_i) * \left(\sum_{j=1}^{m} R_j^t\right)\right) * \left(\prod_{k=1}^{n} W_k * P_k\right).$$

The above example equation computes the health of particular fabric elements "f" at a time "t" where H is the health of the respective element, W is the weight calibrated using a neural network model for each network attribute, and P is the normalized numeric value (e.g. associated with bandwidth, VLAN, MAC, etc.) of each respective fabric element at a timestamp "t". The $W_t$ parameter represents a weight associated with a network element or attribute such as an amount of bandwidth or data usage, for example.

The $(\Pi_{j=1}{}^m R_j{}^t)$ portion of the equation represents the spatial dependencies of other attributes on the current fabric attribute. "R" is the reward computed using reinforcement learning, for all the spatial dependencies on the network attribute and multiplied in the equation to accommodate the dependency of other attributes.

Reinforcement learning involves machine learning behaviorist psychology software agents actions The basic reinforcement learning model consists of a set of environment and agent states, a set of actions of the agent, policies of transitioning from states to actions, rules that determine the scalar immediate reward of a transition and rules that describe what the agent observes. The rules are often stochastic. The observation typically involves the scalar immediate reward associated with the last transition. In many works, the agent is also assumed to observe the current environmental state, in which case full observability is considered, whereas in the opposing case partial observability is considered. Sometimes the set of actions available to the agent is restricted (e.g., you cannot spend more money than what you possess).

A reinforcement learning agent interacts with its environment in discrete time steps. At each time, the agent receives an observation, which typically includes the reward. It then chooses an action from the set of actions available, which is subsequently sent to the environment. The environment moves to a new state and the reward associated with the transition is determined. The goal of a reinforcement learning agent is to collect as much reward as possible. The agent can choose any action as a function of the history and it can even randomize its action selection. In the present case, the evaluation using reinforcement learning, with rewards, is applied in the context of determining dynamic weights for network elements or resources for the purpose of calculating a health score, which is then used for making scheduling decisions.

For example, an agent in a reinforcement learning scenario will receive data about the network such as MAC usage, VLAN usage, etc. The agent will provide, based on a rate of decrease or rate of increase, a report regarding the effect of the changes over time for the VLAN or the MAC. The report can provide data on how much VLAN usage is affecting the computer, or how much CPU usage is affecting the computer, and so forth. One parameter can affect other parameters. The data on usage of various components can be fed into a reinforcement learning algorithm to calculate the "rewards" or output which can relate to the spatial correlation of various network components.

The section $(\Pi_{k=1}{}^n W_k * P_k)$ of the algorithm provides weighting for each administrative state or operational state of a port, where "P" is a normalized Boolean value (e.g., AdminState, Operational state of a port) for each attribute and multiplied in the equation. The weights $W_k$ are weights associated with the respective administrative state for any component of the compute environment or an operational state of a port or switch, for example.

Figure 3:
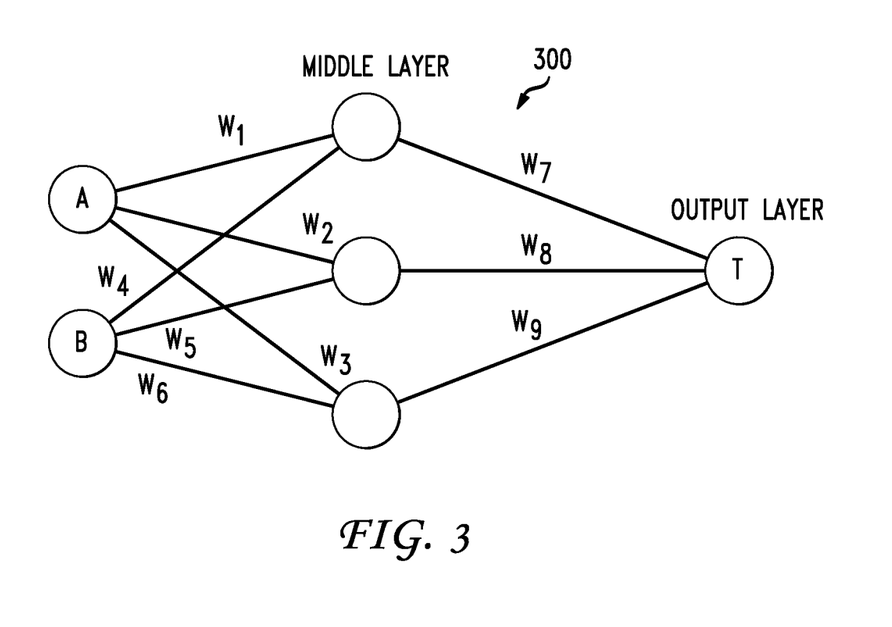
FIG. 3 illustrates a training process using a hidden layer and an output layer.

With respect to the weight calculation ('W' in the above equation), the following details are provided. Before the algorithm is run, the algorithm needs to be fed with training data that can be collected from past history, other fabric environments, or manually created. The training data will have the values of the network health attributes along with a health score. The training data is fed into a neural network 300, such as is shown in FIG. 3. As shown in FIG. 3, 'A' and 'B' are the numeric values of the network attributes like number of VLANs, number of MACs, LAN errors, port errors, etc. The values of w1, w2 . . . represent the weights. Once the system has gathered the training data, the system can apply a set of weights to the input data and calculate an output. Iterating during the learning and training phase can lead to the expected results of running the algorithm.

For the first forward propagation, the set of weights is randomly selected. The weights could also be selected manually or based on historical data of network experience rather than being random. Then, the weights are applied to the network attributes to arrive at the next layer as given in https://stevenmiller888.github.io/mind-how-to-build-a-neural-network/. The content on this website are incorporated herein by reference.

At the hidden layer (the activation layer), the system applies a sigmoid activation function to obtain a result, say 'X': $S(x)=1/(1+e^{\wedge}(-x))$. Non-linearity can be included in this model. The activation function will use the input and the weights to generate the dynamic weights as the output. Other activation functions could be used as wed. Each of the lines from A, B to the hidden layer is a weight connection. From the hidden layer, there are also weighted connections to the output layer which represents the network health. The concept includes training the neural network to learn to determine which parameter is weighted and by how much. From input to output there are forward propagations. Multiple training cycles are beneficial for the network to learn how to weight the output. After a number of cycles, the neural network will learn what the output should be. There of course could be more hidden layers then are shown in FIG. 3. Logical regression can be used in training to improve the selection of weights in the neural network. Once the weights are properly chosen, the neural network can be used to determine dynamic weights for network elements which are then used in scheduling decisions.

The value of "T" in FIG. 3 represents the health value from training data for particular values of A and B. Then, the values of 'T' and 'X' are fed into back propagation to measure the margin of error of the output and adjust the weights accordingly to decrease the error. Once the system has adjusted weights using neural networks, the system can use them as the value for 'W' for each attribute in the 'Health Score Computation' equation.

In one aspect, the weights, once computed, will not change. In another aspect, the weights can be updated after they are computed based on additional data or parameters either automatically or manually.

The reward calculation ('R' in the equation) is discussed next. Spatial correlation reflects or values how each attribute affects other attributes. For example, launching more applications will increase the traffic in a ToR and also increase its hardware usage. This is an easy correlation that a network administrator can make. But, not all the attribute changes or correlations can be easily predicted by an administrator. For example, a hardware attribute 'X' may have no obvious direct logical correlation to a network attribute 'Y', but due to not so obvious reasons, hardware attribute 'X' may affect network attribute 'Y'.

Another example can include a continuous change in one attribute 'A' that can affect attribute 'B' after 't' intervals. The rate of change in 'A' can be spotted to predict 'B'. These kind of correlations cannot be made by just regular observations. To properly evaluate these kinds of correlations requires a larger amount of data being fed to a specialized algorithm that can learn and make such correlations. In this case, if all the switch attributes can be fed in to a Pearson Correlation Coefficient Equation (See https://en.wikipedia.org/wiki/Pearson_correlation_coefficient), then the system can identify the strongly related features. An output can be, for example, a +1 for strongly correlated features or a −1 if features are not strongly correlated. The Pearson Correlation Coefficient Equation is just one example equation that could be applied. Other correlation equations could be used as well.

For the correlated features, the system can run a reinforcement learning algorithm. See, for example, http://www.cs.ubc.ca/~murphyk/Bayes/pomdp.html. The content of this website is incorporated herein by reference. The reinforcement learning algorithm can determine the reward 'R' for individual feature at timestamp 't'. This reward can be used in the health score computation equation as well.

The concepts disclosed herein uses spatial characteristics (related attributes), apart from the existing temporal data to compute the health score of a switch and/or a port. It uses machine learning techniques, which in turn uses the spatial characteristics to calculate the health score over a period of time. The health score value is more accurate and when used for scheduling workloads, and thus provides more stability.

All the prior work done on this subject matter does not make use of machine learning algorithms. Moreover algorithms use rigid coefficients attached to each network characteristics to compute network health, which makes the health computation highly susceptible to erroneous results. None of the prior approaches use spatial characteristics of the network properties.

Forecasting of network metrics using correlation of different attributes and incorporating it in the health score computation will achieve more accurate results. The algorithm proposed herein can provide a "bird's eye" view of health for each fabric element (i.e., fabric port, fabric switch, fabric router and/or the entire network) which can be easily integrated into schedulers of cloud controllers (Openstack, Docker Swarm, Kubernetes etc.) via REST APIs.

Figure 4:
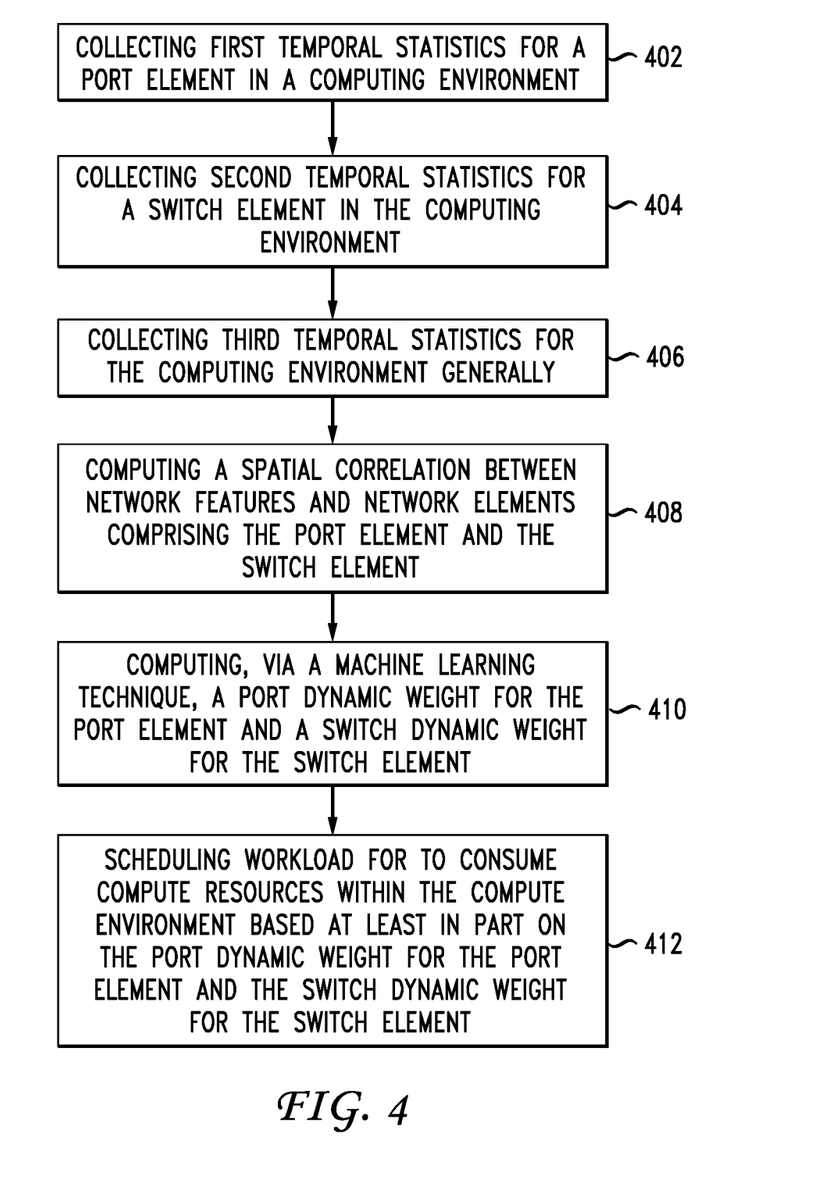
FIG. 4 illustrates a method embodiment.

[5] FIG. 4 illustrates an example method embodiment. The method includes collecting first temporal statistics for a port element in a computing environment (402), collecting second temporal statistics for a switch element in the computing environment (404), collecting third temporal statistics for the computing environment generally (406), computing a spatial correlation between network features and network elements including at least one of the port element and the switch element (408) and computing, via a machine learning technique, at least one of a port dynamic weight for the port element and a switch dynamic weight for the switch element (410). The method can also include scheduling workload to consume compute resources within the compute environment based at least in part on one or more of the port dynamic weight for the port element and the switch dynamic weight for the switch element (412). The scheduling can also be selected based on other parameters as well. Collecting the first temporal statistics can include collecting historical and current metrics to generate the first temporal statistics. Similarly, collecting the second temporal statistics can further include collecting historical and current metrics to generate the second temporal statistics. Collecting the third temporal statistics further can include collecting historical and current metrics to generate the third temporal statistics.

[6] An aspect of this disclosure can also include computing a health computation score for one of the port element or the switch element. Other elements as well can be included in the health computation score. The health computation score can apply to any network element or attribute, such as bandwidth available between two components, a virtual attribute or feature, or a health of an overall fabric environment.

[7] The health score can then be used to schedule workload in a more stable way into the compute environment. The health score can be more predictive than other approaches and can anticipate that there might be fabric bandwidth issues behind a certain ToR switch that may likely require workload migration and thus schedule the workload at the anticipated migration destination in the first instance to avoid the overhead of migrating. The health score might indicate that software or hardware resources are going to run low for a particular workload behind a certain ToR. The scheduling decision can take this into account and schedule the workload to run behind a different ToR.

[8] The health score can be correlated as well with workload affinity characteristics. For example, if a certain workload will likely require heavy bandwidth usage or CPU usage, then that workload affinity or characteristic can be taken into account, in connection or correlated with the health score, when making a scheduling decision. For example, if the health score of a switch ToR2 indicates a likely bandwidth issue associated with the switch, but the workload characteristics indicate that the workload will utilize CPU resources heavily but will utilize bandwidth resources sparingly, then all of that data can result in a scheduling decision to schedule with workload still behind ToR2 notwithstanding the predicted bandwidth issues. In this regard, a weighting of workload affinity can be also taken into account with the health score and dynamic weights disclosed herein to make scheduling decisions.

[9] The approach disclosed herein should reduce the need to migrate workload in that initial scheduling decisions will be better and more stable. Where migration is necessary, however, migration decisions of workload can also be made utilizing the health score of network elements and/or the workload affinity characteristics. An algorithm could balance affinity characteristics with the dynamic weights associated with health scores of respective network elements to make migration decisions.

Figure 5:
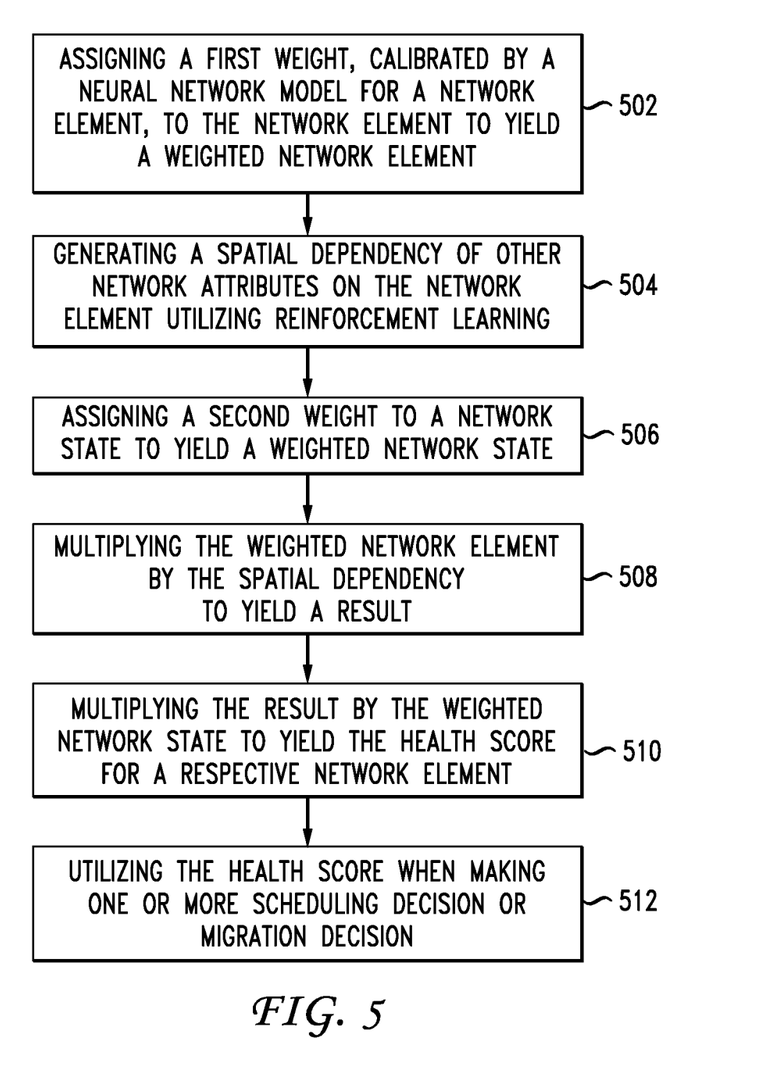
FIG. 5 illustrates another method embodiment.

[10] Another aspect is disclosed in FIG. 5. A method is disclosed of calculating a health score H of a fabric element in a compute environment at a time t, the method including assigning a first weight, calibrated by a neural network model for a network element, to the network element to yield a weighted network element (502). The method includes generating a spatial dependency of other network attributes on the network element utilizing reinforcement learning (504) and assigning a second weight to a network state to yield a weighted network state (506). In one aspect, the weighted network element is multiplied by the spatial dependency to yield a result (508), with the result being multiplied by the weighted network state to yield the health score for a respective network element (510). The algorithm can be run for more than one network element or network feature such that one or more health scores can be applied or taken into account when making one or more of scheduling decisions or migration decisions (512). By forecasting network metrics utilizing the spatial characteristics as disclosed herein, the present solution improves upon scheduling or migration decisions by providing a more accurate and stable decision making process.

In some embodiments the computer-readable storage devices, mediums, and/or memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims. Moreover, claim language reciting "at least one of" a set indicates that one member of the set or multiple members of the set satisfy the claim.

It should be understood that features or configurations herein with reference to one embodiment or example can be implemented in, or combined with, other embodiments or examples herein. That is, terms such as "embodiment", "variation", "aspect", "example", "configuration", "implementation", "case", and any other terms which may connote an embodiment, as used herein to describe specific features or configurations, are not intended to limit any of the associated features or configurations to a specific or separate embodiment or embodiments, and should not be interpreted to suggest that such features or configurations cannot be combined with features or configurations described with reference to other embodiments, variations, aspects, examples, configurations, implementations, cases, and so forth. In other words, features described herein with reference to a specific example (e.g., embodiment, variation, aspect, configuration, implementation, case, etc.) can be combined with features described with reference to another example. Precisely, one of ordinary skill in the art will readily recognize that the various embodiments or examples described herein, and their associated features, can be combined with each other. For example, while some specific protocols such as 802.11 and 802.3 are mentioned in the examples above, the principles could apply to any communication protocol and does not have to be limited to these particular protocols. Any configuration in which received data is acknowledged through an ACK signal could implement the concepts disclosed herein.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa. The word "exemplary" is used herein to mean "serving as an example or illustration." Any aspect or design described herein as "exemplary" is not necessarily to be construed as preferred or advantageous over other aspects or designs.

Moreover, claim language reciting "at least one of" a set indicates that one member of the set or multiple members of the set satisfy the claim. For example, claim language reciting "at least one of A, B, and C" or "at least one of A, B, or C" means A alone, B alone, C alone, A and B together, A and C together, B and C together, or A, B and C together.

What is claimed is:

1. A method comprising:
   collecting, via at least one processor, first temporal statistics for a port element in a computing environment;
   collecting, via the at least one processor, second temporal statistics for a switch element in the computing environment;
   collecting, via the at least one processor, third temporal statistics for the computing environment, the collecting of the third temporal statistics including collecting historical and current metrics for the computing environment;
   computing, via the at least one processor, a spatial correlation between network features and network elements comprising the port element and the switch element;
   computing a health score for the port element or the switch element by factoring the first temporal statistics, the second temporal statistics, the third temporal statistics, and the spatial correlation;

computing, via a machine learning technique, a port dynamic weight for the port element and a switch dynamic weight for the switch element; and scheduling a workload to consume computing resources in the computing environment based on the health score, the port dynamic weight, and the switch dynamic weight.

2. The method of claim 1, wherein the collecting of the first temporal statistics includes collecting historical and current metrics for the port element.

3. The method of claim 1, wherein the collecting of the second temporal statistics includes collecting historical and current metrics for the switch element.

4. The method of claim 1, wherein the computing of the health score for one of the port element and the switch element includes using an equation to compute the health score as follows:

$$H_f^t = \left( \sum_{i=1}^{n} (W_i * P_i) * \left( \prod_{j=1}^{m} R_j^t \right) \right) * \left( \prod_{k=1}^{n} W_k * P_k \right),$$

wherein:

H is a health of a respective network element "f" at a time "t";

W is a weight calibrated using a neural network model for each network element;

P is a normalized numeric value for each respective fabric element at the time "t";

$(\Pi_{j=1}{}^m R_j^t)$: represents spatial dependencies of other attributes on a respective network element;

"R" is a reward computed using reinforcement learning, for the spatial dependencies on the respective network element and multiplied to accommodate the dependency of other attributes;

$(\Pi_{k=1}{}^n W_k * P_k)$: where "P" is a normalized boolean value for each attribute and multiplied into the equation.

5. A system comprising:
at least one processor; and
a computer-readable storage device storing instructions which, when executed by the at least one processor, cause the at least one processor to perform operations comprising:
collecting first temporal statistics for a port element in a computing environment;
collecting second temporal statistics for a switch element in the computing environment;
collecting third temporal statistics for the computing environment, the collecting of the third temporal statistics including collecting historical and current metrics for the computing environment;
computing a spatial correlation between network features and network elements comprising the port element and the switch element;
computing a health score for the port element or the switch element by factoring the first temporal statistics, the second temporal statistics, the third temporal statistics, and the spatial correlation;
computing, via a machine learning technique, a port dynamic weight for the port element and a switch dynamic weight for the switch element; and
scheduling a workload to consume computing resources in the computing environment based on the health score, the port dynamic weight, and the switch dynamic weight.

6. The system of claim 5, wherein the collecting of the first temporal statistics includes collecting historical and current metrics for the port element.

7. The system of claim 5, wherein the collecting of the second temporal statistics includes collecting historical and current metrics for the switch element.

8. The system of claim 5, wherein the computing of the health score for one of the port element and the switch element includes using an equation to compute the health score as follows:

$$H_f^t = \left( \sum_{i=1}^{n} (W_i * P_i) * \left( \prod_{j=1}^{m} R_j^t \right) \right) * \left( \prod_{k=1}^{n} W_k * P_k \right),$$

wherein:

H is a health of a respective network element "f" at a time "t";

W is a weight calibrated using a neural network model for each network element;

P is a normalized numeric value for each respective fabric element at the time "t";

$(\Pi_{j=1}{}^m R_j^t)$: represents spatial dependencies of other attributes on the respective network element;

"R" is a reward computed using reinforcement learning, for all the spatial dependencies on the respective network element and multiplied to accommodate the dependency of other attributes;

$(\Pi_{k=1}{}^n W_k * P_k)$: where "P" is a normalized boolean value for each attribute and multiplied into the equation.

9. A non-transitory computer-readable storage device storing instructions which, when executed by at least one processor, cause the at least one processor to perform operations comprising:
collecting first temporal statistics for a port element in a computing environment;
collecting second temporal statistics for a switch element in the computing environment;
collecting third temporal statistics for the computing environment, the collecting of the third temporal statistics including collecting historical and current metrics for the computing environment;
computing a spatial correlation between network features and network elements comprising the port element and the switch element;
computing a health score for the port element or the switch element by factoring the first temporal statistics, the second temporal statistics, the third temporal statistics, and the spatial correlation;
computing, via a machine learning technique, a port dynamic weight for the port element and a switch dynamic weight for the switch element; and
scheduling a workload to consume computing resources in the computing environment based on the health score, the port dynamic weight, and the switch dynamic weight.

10. The non-transitory computer-readable storage device of claim 9, wherein the collecting of the first temporal statistics includes collecting historical and current metrics for the port element.

11. The non-transitory computer-readable storage device of claim 9, wherein the collecting of the second temporal statistics includes collecting historical and current metrics for the switch element.

12. The non-transitory computer-readable storage device of claim 9, wherein the computing of the health score for one of the port element and the switch element includes using an equation to compute the health score as follows:

$$H_f^t = \left(\sum_{i=1}^{n}(W_i * P_i) * \left(\prod_{j=1}^{m} R_j^t\right)\right) * \left(\prod_{k=1}^{n} W_k * P_k\right),$$

wherein:
  H is a health of a respective network element "f" at a time "t";
  W is a weight calibrated using a neural network model for each network element;
  P is a normalized numeric value for each respective fabric element at the time "t";
($\Pi_{j=1}^{m} R_j^t$): represents spatial dependencies of other attributes on the respective network element;
  "R" is a reward computed using reinforcement learning, for all the spatial dependencies on the respective network element and multiplied to accommodate the dependency of other attributes;
($\Pi_{k=1}^{n} W_k * P_k$): where "P" is a normalized boolean value for each attribute and multiplied into the equation.

* * * * *